Feb. 8, 1966  M. A. MOSKOVITZ  3,233,317
COMBINATION KNOCK-OUT AND DRIVE-IN TOOL FOR
CARTRIDGE TYPE BALL-JOINTS
Filed Sept. 23, 1963
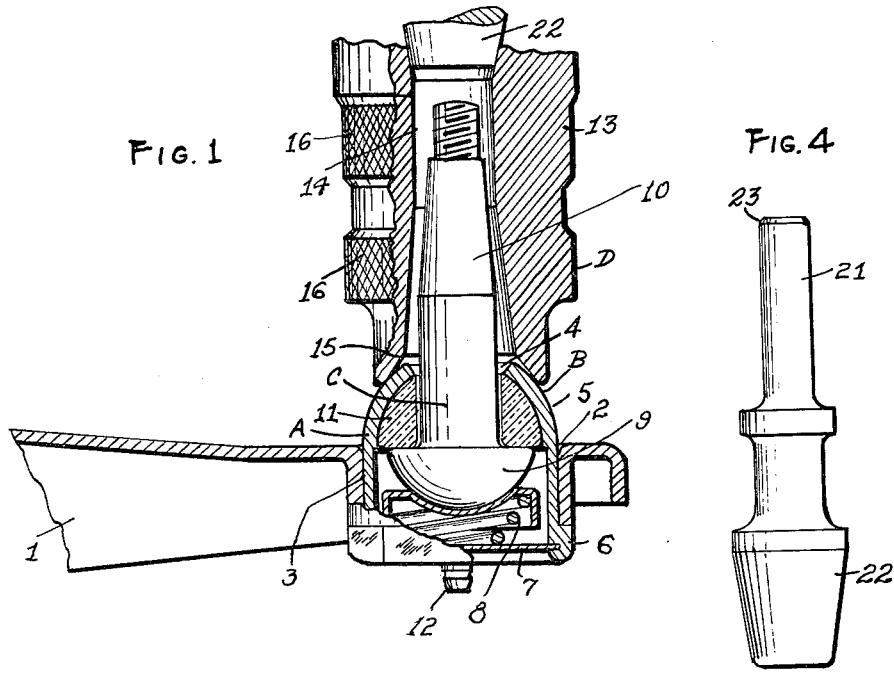
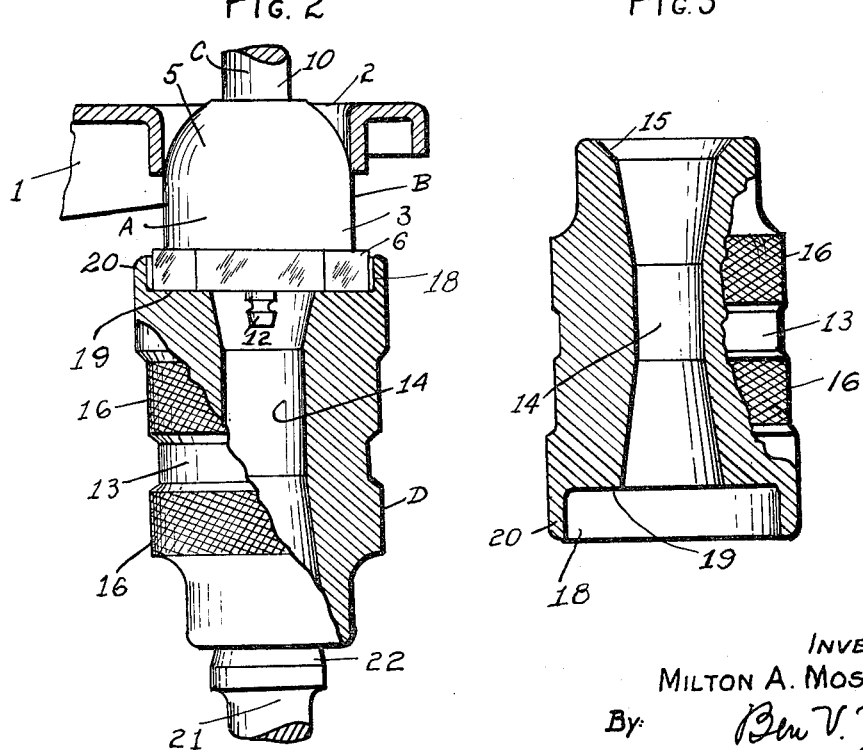
INVENTOR
MILTON A. MOSKOVITZ
By: Ben V. Zillman
ATTORNEY

United States Patent Office 3,233,317
Patented Feb. 8, 1966

3,233,317
COMBINATION KNOCK-OUT AND DRIVE-IN TOOL
FOR CARTRIDGE TYPE BALL-JOINTS
Milton A. Moskovitz, 7 Chapel Hill,
St. Louis County 32, Mo.
Filed Sept. 23, 1963, Ser. No. 310,792
2 Claims. (Cl. 29—275)

In present-day auto construction, a cartridge-type ball-joint unit is employed for interconnecting control arms to the front wheel steering knuckles. Manipulation of said units after the auto has left the factory, is costly, inasmuch as such operations are relatively tedious and cumbersome, and therefore the principal object of my invention is to provide a single tool, simple in construction and operation, that may be used for both knocking out and replacing such cartridge units in the field.

Another object of the invention is to so construct a tool of the kind described that it is in the form of an annular elongated sleeve open at both ends, one end being of a size to receive that portion of the joint unit that projects outwardly through the control arm eye, whereby axial thrust on the tool when so positioned will knock out the joint unit from said eye, the other end of the tool being so sized and shaped to receive the opposite end of the replacement joint unit, whereby axial thrust then directed on said tool, in a reverse direction, will drive said replacement unit through said eye into its operative position therein.

Many other objects and advantages of the construction herein shown and described, and the uses of the same, will be obvious to those skilled in the art to which this invention appertains, as will be more clearly pointed out in the following disclosure.

To this end, my invention consists in the novel construction, arrangement and combination herein shown and described, and the uses mentioned, all as will be more readily understood by the following specification.

In the drawings, wherein like reference characters represent like or corresponding parts throughout the views:

FIGURE 1 is a view, partly in section and partly in elevation, showing the cartridge unit about to be knocked out of its interlocked relation within an eye of a control arm;

FIGURE 2 is a view, partly in section and partly in elevation, showing the tool in use for inserting a replacement unit into said eye;

FIGURE 3 is a view, partly in section and partly in elevation, of one element of the operating tool; and FIGURE 4 is a plan view of the stem used in cooperation with the sleeve element shown in FIG. 3.

Referring more particularly to the drawings, wherein I have illustrated the preferred embodiment of my invention, 1 indicates one end of a supporting structure of a steering assembly, as for instance the lower control arm, one end of the latter having an eye 2 therethrough and with a pre-assembled cartridge-type ball-joint unit A interlocked tightly therein. Such interlock is sometimes by a threaded interconnection, but as shown in the drawings, it may be by a good and tight press-fit frictional engagement therebetween.

Such a cartridge unit includes the usual hollow shell, housing or casing B whose annular enclosing portion 3 is of such external diameter as to provide proper press-fit engagement within the enclosing wall of said eye, as shown, and one end of said shell B is diametrally reduced in size as indicated at 5, and there is a reduced transverse opening 4 at said end and through which the shank 10 of a stud C projects.

The other end of said shell B is provided with a radially outwardly-projecting flange 6, of such size that said flanged end is sufficiently radially enlarged so that it can not be passed through said eye 2. This larger end of the shell has the usual closure plate 7 thereacross, and there may be resilient pressure means such as the spring and plate 8 interposed between the stud and said closed end of the shell.

A wear take-up bearing 11 may be interposed between the concave interior surface of said reduced end 5 of the shell B and said stud C, so that movement of the latter is transmitted through said bearing 11 to the shell B. A grease fitting 12 may be carried by said joint, to communicate with the chamber within the latter, for proper lubrication, if so desired.

In order to replace such type of joint for any reason, the present shop practice is to first disconnect the control arm, control arm shaft, spring and shock absorber from the car, after which the control arm is placed in a vise for any subsequent work thereon. Obviously, this type of procedure requires considerable time, and use of the shop space such as the work bays, and of other facilities, both during the removal of the cartridge and the replacement of the same.

In the invention herein shown it is not necessary that the control arm be removed from the car for the operations of removing the old cartridge or replacing a new one.

To that end, I have formed a tool whose main element 13 is of preferably only a single piece of axially elongated relatively sturdy metal, such as steel, having a central bore 14 thereinto from both ends to form an annular sleeve D to fully loosely receive the exposed length of the stud shank 10 thereinto, as shown in FIG. 1, and there being a preferably tapered cavity 15 to provide a beveled radially inexpandable surface extending axially into said element from said end and communicating with said bore as shown in FIG. 3, the exterior surface of said element D being knurled as indicated at 16—16 is so desired, to thereby better grasp the tool during its use.

It is important that the size of the tool element D be sufficiently small at one end to pass through said eye, and that said tapered cavity 15 be of a size that when the tool is mounted on said reduced end 5 of the joint shell B, coaxially with the latter, the wall of the tapered cavity forms a good annular bearing contact with the shell B.

The other end of said element 13 has a radially enlarged cavity or counterbore 18 thereat communicating with the central bore 14 as shown in FIG. 3. The inner end of said cavity 18 terminates at an annular shoulder or band 19 and is shaped to receive and seat the outermost face of said flange 6 of the ball-joint unit A. The cavity 18 thus defines the inner wall of an annular flange 20 at said end of said element 13, the axial length of said flange 20 being less than the height or depth of said flange 6, so that when said tool is positioned with a replacement cartridge unit therein, and is placed in axial registry with said eye 2 as shown in FIG. 2, the shell flange 6 will be properly seated within the cavity 18, with only a portion of the cartridge flange projecting axially beyond the tool.

A stem element 21, generally elongated in form, may be used to cooperate with said tool element 13 during manipulation of the latter. One end 22 of said stem element is preferably increasingly tapered rearwardly of its terminal edge, and formed to such size that said tapered portion may be operably detachably inserted alternately into both ends of the central bore. The other end 23 of said stem is adapted to be operably connected to a suitable source of power (not shown) for actuating the tool relatively of the supporting structure.

When about to remove a worn or defective joint from the control arm, all of the various parts to which it is connected, are left connected and intact, and there need be no dis-assembly of the joint except that said arm is dis-connected from the knuckle (not shown) to which it is secured, this being done by simple removal of a fastening nut, and then the car is placed so that the control arm is on jacks or the like so that impact pressure directed toward said eye will be taken up by said jacks.

Then, the tool element 13 is positioned in axial registry with said cartridge unit A, as indicated in FIG. 1, and with the tapered end 22 of the stem element 21 in place within the sleeve, proper actuating force is applied to advance said tool element 13 and stem element 21 axially relatively of the eye, thus knocking the cartridge A from the latter, and permitting the adjacent reduced end of the tool element 13 to pass through said eye, if desired.

To insert a new cartridge unit within an eye, the cartridge is seated in the larger cavity 18 of the tool element 13, as indicated in FIG. 2, and said tool element 13 is then placed in axial registry with the eye, after which initial positioning, the tapered end 22 of the stem element 21 is placed in the other end of the sleeve element and the required force applied to advance the tool element, driving the cartridge forwardly until the flange 6 of the ball-joint shell B abuts against the adjacent bounding face of said eye. The relationship between the depths of the cartridge flange 6 and the radially enlarged cavity 18 of the tool element 13 insures that proper and full insertion of the cartridge ball joint will be had.

Both the knock-out and the replacement operations are performed in but a fraction of the total time that is required by the method first set forth, principally because no time is needlessly lost in initially preparing the control arm for work operations. Thus, such savings can be used to reduce the costs for ball joint repairs.

It may be mentioned, that by making the tool parts relatively heavy, there is a high degree of impact inertia present, and this permits of utmost press-fit engagement to result from their use.

I claim:

1. A tool for knocking out an assembled ball-joint unit relatively of an eye of a supporting structure without dis-assembling said unit, said joint unit being of the type comprising a shell whose one end is externally convex and has a radially reduced opening therethrough through which a stud projects, the other end of said shell being closed and being radially enlarged to permit the shell to be inserted into said eye axially from only one direction; said tool comprising a body having a first end smaller than said eye and having a second end, an opening extending axially into the said first end, a tapered radially inexpandable annular wall defining the mouth of said opening, the said mouth of the opening being sized to bear against the externally convex end of the shell, with the opening being sized to receive the stud of the joint unit, a tapered recess in the second end converging from the second end toward the first end adapted to wedgingly receive the tapered head of a driving element, whereby when said tool is in axial registry with said shell with said stud within the sleeve opening, said mouth of said opening may engage said shell radially beyond said reduced opening of the latter and axial thrust applied to the second end of said tool may knock said unit from said eye.

2. A reversibly operable tool for knocking out or driving in a ball-joint unit assembly relatively of an eye of a supporting structure without disassembling the unit, said unit being of the type having a hollow shell with a radially-reduced head end of larger diameter than said eye, and with a stud in said shell projecting axially beyond said reduced end; said tool comprising an elongated sleeve smaller in external diameter at one end than at the other and having a central bore axially therethrough, opposite ends of the bore being rdially enlarged to define radially enlarged cavities, said bore being decreasingly tapered at the same angle inwardly from both said cavities, one such cavity being of smaller diameter than the other and of a size adapted to seat against and partially receive said reduced end portion of said shell, the external diameter of the sleeve adjacent said smaller cavity being such as to be able to pass through said eye, said larger cavity being larger than said eye and being of a size adapted to seatingly encircle the shell head, and an elongated stem having one end tapered to the same angle as that of both of said tapered portions of said bore to selectively detachably nestingly fit into either of said tapered portions of said bore, whereby actuation of said stem while so seated in one end of said sleeve and while the smaller cavity end engages the shell knocks the unit from the eye, and actuation of the stem while in the other end of said bore while the shell head is seated in the sleeve drives the unit into operative engagement into said eye.

References Cited by the Examiner

UNITED STATES PATENTS

| | | | |
|---|---|---|---|
| 900,337 | 10/1908 | Wingate | 29—275 |
| 2,861,330 | 11/1958 | Kratz | 29—275 |
| 2,932,082 | 4/1960 | Rosan | 29—275 |
| 3,099,079 | 7/1963 | Stein | 29—275 |

WILLIAM FELDMAN, *Primary Examiner.*

MYRON C. KRUSE, *Examiner.*